TELEVISION FM TUNER CONVERTER

Filed Aug. 26, 1958 3 Sheets-Sheet 1

INVENTOR.
ROBERT C.A. ELAND
BY Ostrolenk, Faber, Gerb & Soffen
ATTORNEYS

TELEVISION FM TUNER CONVERTER

Filed Aug. 26, 1958

3 Sheets-Sheet 2

INVENTOR.
ROBERT C. A. ELAND

BY Ostrolenk, Faber, Gerb & Soffen

ATTORNEYS

June 2, 1964 R. C. A. ELAND 3,135,922

TELEVISION FM TUNER CONVERTER

Filed Aug. 26, 1958 3 Sheets-Sheet 3

INVENTOR.
ROBERT C. A. ELAND

BY Ostrolenk, Faber, Gerb & Soffen
ATTORNEYS

United States Patent Office 3,135,922
Patented June 2, 1964

3,135,922

TELEVISION FM TUNER CONVERTER

Robert C. A. Eland, Arcadia, Calif., assignor to Standard Coil Products Co. Inc., Melrose Park, Ill., a corporation of Illinois Filed Aug. 26, 1958, Ser. No. 757,248
11 Claims. (Cl. 325—461)

This invention relates to FM broadcast radio tuners with circuitry for converting conventional television receivers for FM radio reception.

More particularly, the present invention relates to utilization of a conventional FM radio tuner in a television receiver using intercarrier FM sound circuitry. The invention is further directed to novel constructional arrangements for stable FM tuner, wherein only a single vacuum tube is employed with tracking means having simplicity and low cost.

The audio portion of a television program is broadcast as frequency modulation. The FM carrier of each TV channel in the United States is standardized by being spaced at 4.5 megacycles from the corresponding video carrier. Intercarrier circuits have been developed to use a common IF amplifier for the amplitude modulated video and the frequency modulated audio portions of the broadcast TV channels. The practically universal adoption of such intercarrier circuitry in television receivers has heretofore rendered it impractical to receive broadcast FM radio programs in such receivers. The assigned television bands are 54 to 88 mc. and 174 to 216 mc. The broadcast FM radio band starts at 88 mc. and extends to 108 mc.

Prior to the introduction of intercarrier circuitry in television receivers, it was common practice to receive FM radio broadcasts by merely extending the RF amplifier tuning of a television set from the channel 6 position at 88 mc. The present invention is directed to overcome the disadvantages encountered in FM radio reception and translation by intercarrier television receivers. It utilizes the RF stage of the tuner, the IF amplifier, and the whole TV audio system including the FM detector, audio amplifier and loud speaker, volume and tone controls, etc.

In accordance with the present invention, a commercial FM tuner is mounted or otherwise connected to the input of the tuner of a television receiver. Commercial FM tuners have an IF output near 11 mc., commonly being at 10.7 mc. The IF amplifiers of current television receivers are generally in the 41 plus mc. range. The television tuner is converted with an "FM strip" or position, wherein the twelve-channel television tuner is converted for FM signal reception. The FM tuner output at its intermediate frequency is introduced to the RF section of the TV tuner, and is converted by the oscillator-mixer section to a corresponding signal within the 41 plus mc. IF amplifier bandpass. This converted signal contains the frequency modulations of the audio broadcast as tuned-in by the FM tuner ahead of the TV receiver.

Further in accordance with the herein invention, the TV tuner provides a carrier signal for the IF amplifier at a frequency spaced from the converted FM signal by 4.5 megacycles. Thus two carrier signals are introduced to and amplified through the 41 plus mc. IF amplifier, and thereupon connected to the input of the 4.5 mc. frequency discriminator or ratio detector. In this manner the amplified FM signals are directly demodulated in the same manner as is the FM audio section of each TV channel, and in turn conducted through the audio frequency amplifier and speaker system of the receiver.

Another important aspect of the present invention is a novel FM radio tuner incorporating only a single vacuum tube, with automatic frequency control. The FM tuner further incorporates simplified mechanical and electrical arrangements greatly simplifying its assembly and tracking operations. The tuning of the FM tuner sections is with axially adjustable metallic slugs providing a logarithmic frequency change with linear displacements. The AFC circuit for the FM tuner is provided with a silicon junction diode in a manner to be described in more detail hereinafter, eliminating the complexity and power requirements of prior vacuum tube circuitry therefor.

It is accordingly an object of the present invention to provide a novel conversion system and circuitry for the reception of FM radio signals by an intercarrier television receiver.

Another object of the present invention is to provide novel circuitry and means for converting a twelve-channel TV tuner for FM radio broadcast signal reception and translation through the TV receiver to the audio counterpart.

A further object of the present invention is to provide a novel conversion system for a television receiver adapted to receive FM broadcast signals at a conventional IF frequency of FM tuners, namely near 11.0 mc., and translate such FM input signals through an intercarrier TV receiver.

Still another object of the present invention is to provide a novel FM tuner of simplified circuitry and construction incorporating AFC through a silicon diode.

Still a further object of the present invention is to provide a novel FM tuner unit of simplified and inexpensive construction, with tuning slugs providing logarithmic tuning response.

The above and further objects and advantages of the present invention will become more apparent from the following description of an exemplary embodiment thereof, taken in connection with drawings, in which:

FIGURE 3 is a schematic electrical diagram of an exemplary TV tuner incorporating the FM conversion circuitry.

Figure 1:
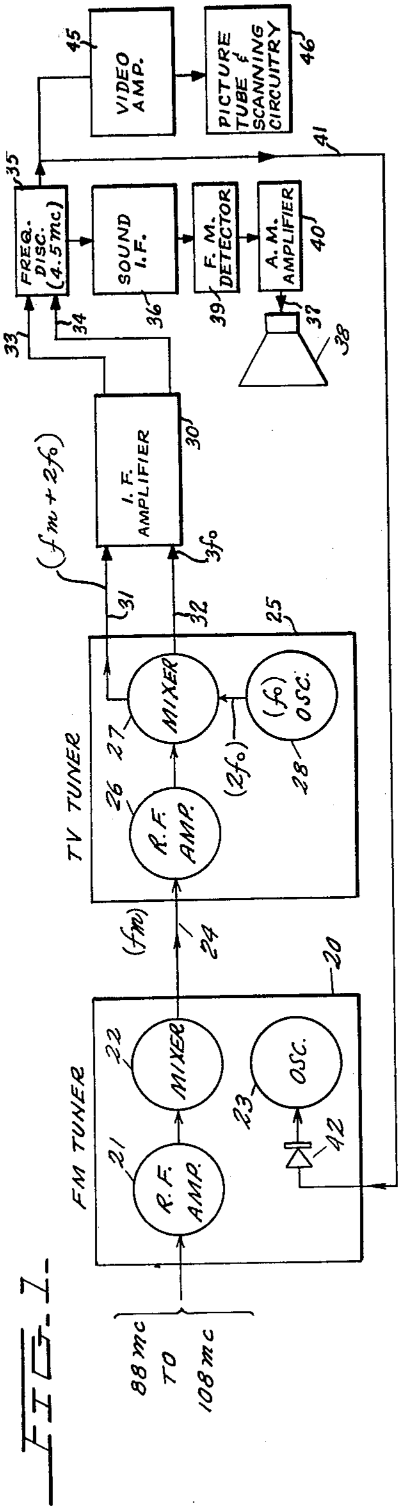
FIGURE 1 is a diagrammatic showing of the overall FM tuner TV receiver incorporating circuitry of the present invention.

In FIGURE 1, FM tuner 20 has impressed upon its RF amplifier 21 FM radio broadcast signals in the 88 to 108 mc. band. The amplified FM signals are impressed upon mixer 22, as is a local oscillator signal from oscillator 23. The IF output of FM tuner 20 is at the frequency $f_m$. In a conventional FM tuner for use in FM radio broadcast receivers, the IF frequency $f_m$ is generally of the order of 11 mc. and commercially commonly at 10.7 mc. However, the FM tuners are readily tracked to another nearby $f_m$ frequency. In the present invention this IF output frequency $f_m$ is adjusted to, for example, 11.7 mc. for reasons to be described hereinafter.

The TV tuner 25 has a conventional RF amplifier 26, the output of which is applied to a mixer 27. The local oscillator 28 of TV tuner 25 is adjusted at a frequency designated as $f_o$ when in the FM conversion mode. In the exemplary tuner, where the TV intercarrier IF system is in the 41-plus mc. range, the value for $f_o$ is set at 16.2 mc. The 11.7 mc. frequency modulated carrier from FM tuner 20 is applied to mixer 27 in the FM mode, and is heterodyned with the second harmonic of $f_o$, namely at $2f_o$. In the present example this produces a frequency modulated signal upon the new carrier frequency 44.1 mc. This signal is indicated at output lead 31 of the mixer 25 with the frequency value $(f_m+2f_o)$. An important feature of the present invention is to apply a further signal to IF amplifier 30 diagrammatically indicated as through lead 32. In the exemplary FM mode this latter signal is the third harmonic of oscillator 28, namely $3f_o$, being in the present example at 48.6 mc. In actual practice leads 31, 32 will be the single IF output of the tuner section 25, with the two signals $(f_m+2f_o)$ and $3f_o$ carried thereby (as shown in schematic FIGURE 3).

Thus the two signals impressed into the input of the IF amplifier 30 have a carrier frequency separation of 4.5 mc. The composite output of the IF amplifier 30 is applied to the radio detector or frequency discriminator 35 by output leads 33, 34. Separate leads 33, 34 are shown diagrammatically to indicate the presentation of the two separate signals $[(f_m+2f_o)$ and $3f_o]$ from the output of IF amplifier 30 to the input of frequency discriminator 35. In actual practice only one such lead physically couples these 4.5 mc. separated carrier frequencies, as is the conventional practice, to couple the audio and video carriers when operating the television receiver in its normal manner. The intercarrier frequency discriminator 35 is adjusted for operation with two carriers separated by 4.5 mc. and demodulates or detects the frequency modulated broadcast signals applying them to 4.5 mc. sound IF stage 36, FM detector stage 39, and AF amplifier 40. A loud speaker 38 connects to the output of AF amplifier 40 through lead 37. The upper carrier frequency output 41 of the frequency discriminator 35 will, in the television reception mode of operation of the TV receiver, contain the video signal. This signal is then coupled to video amplifier 45 and then to the picture tube and scanning circuitry, generally shown as 46. In the FM tuner mode of operation, in accordance with my invention, signal 41 is the $3f_o$ carrier, which advantageously provides automatic frequency control of tuner 20, as will be subsequently discussed. It should be recognized that the block diagram arrangement shown in FIGURE 1 is one of the conventional types of intercarrier systems presently employed in home TV receivers. Some modifications from that specifically shown in FIGURE 1 are well known, as for example the frequency discriminating stage 35 may be placed after video amplifier 45, with it being understood that the basic concepts of the instant invention will likewise be compatible with such an intercarrier arrangement. The IF amplifier 30, frequency discriminator 35, sound IF 36, FM detector 39, AF amplifier 40, loud speaker 38, video amplifier 45, and picture tube and scanning circuitry 46 are all part of the conventional intercarrier television receiver as used for the reception of TV programs having a frequency modulated sound portion of the TV channels.

The IF amplifier 30 is used for the simultaneous amplification of the FM sound and AM video modulations of the television channels. The TV tuner 25 operates the same as a conventional TV tuner, when used in its television reception mode. However, it has specific circuitry for the conversion of FM radio signal to provide for the amplification and demodulation of the frequency modulated signals in the manner described.

It is to be noted that the third harmonic, namely $3f_o$ in the above example was selected at 48.6 mc. which is at a frequency somewhat higher than the usual 41-plus mc. IF amplifier bandpass. Such third harmonic frequency is preferred located above the band-pass of the IF unit 30 to prevent it from biasing off the IF amplifier circuit. It has been found that the carrier $3f_o$ comes through sufficiently strong to coact with the modulated carrier ($f_m$ and $2f_o$) signal at frequency discriminator 35 to suitably detect thereat. The other beat frequencies and harmonics generated at TV tuner 25 in the FM mode are either rejected by IF amplifier 30 or by frequency discriminator 35. Thus the audio signals reproduced at speaker 38 are of the high quality desired for the reception of the FM radio programs.

It is to be understood that the frequency output of FM tuner 20, at lead 24 for frequency $f_m$ may be different than the 11.7 mc. selected in for exemplary embodiment. Correspondingly the frequency selected for local oscillator 28 namely $f_o$ at 16.2 mc. may be different. The following mathemtical relationship is involved in the relation between $f_o$ and $f_m$. Specifically the third harmonic signal at lead 32 and the FM modulated second harmonic signal at lead 31 have their carriers separated by that required for the FM demodulator (35) to function properly. Conventional discriminators or ratio detectors require a 4.5 mc. separation. However, other circuits may use a different separation. Mathematically this can be expressed as:

(*a*) $$(3f_o)-(f_m+2f_o)=4.5 \text{ mc.}$$
(or requisite detector separation)

(*b*) $$f_o-f_m=4.5 \text{ mc.}$$

(*c*) $$f_o=(f_m+4.5 \text{ mc.})$$

It is thus seen that the frequency for the basic oscillator at 28 of TV tuner 25 is adjusted at 4.5 mc. above the desired frequency $f_m$ namely the IF output of FM tuner 20. In the exemplary embodiment with $f_m$ at 11.7 mc., $f_o$ at 16.2 mc. is 4.5 mc. higher. The second and third harmonics of $f_o$ are selected to be related to the IF amplifier (30) band-pass of the TV receiver in the manner described herein the FM modulated relatively narrow band, $(f_m+2f_o)$ falls within the band-pass, and the third harmonic $(3f_o)$ falls preferably somewhat beyond the band-pass. Should a suitable IF amplifier (30) be available which is not biased-off by the carrier $3f_o$ signal, both signals from leads 31 and 32 may be arranged to fall within the band-pass of the IF amplifier. Also, the IF output ($f_m$) of FM tuner 20 is selected near the standard 10.7 mc. value and is also related to the selected $f_o$ value and the IF amplifier 30 band-pass as will now be understood.

It is a simple matter to track an FM tuner (20) nominally designed for an IF output ($f_m$) at 10.7 mc. to the $f_m$ desired for use in the TV receiver. In this manner the same FM tuner unit manufactured for use in FM broadcast radio receivers is also usable in TV receivers with the conversion system of the present invention. Here the 10.7 mc. tuner is adjusted for 11.7 mc. or other selected $f_o$ value nearby.

A further important feature of the present invention is the provision of the automatic frequency control or AFC for the FM tuner in a simple and inexpensive manner. Prior art FM tuners utilize at least an additional tube to provide AFC for stabilizing the FM tuner and detection operation. A silicon junction diode 42 is used in a simple and very effective manner for this purpose. The silicon diode 42 is connected between lead 41 from the ratio detector or frequency discriminator 35 to the oscillator 23 of the FM tuner. The ratio detector at 35 having a fixed carrier, namely $3f_o$ therein provides the AFC voltage or back bias for the diode 32 through lead 41.

The silicon junction diode has a characteristic that varies in capacitance with the amount of power bias applied to it. Such capacitance varies as much as three-to-one. The diode 42 acts as a variable capacity in the oscillator 23 circuit in correspondence with the back bias applied thereto through lead 41 in a manner more fully described in connection with FIGURE 2.

Figure 2:
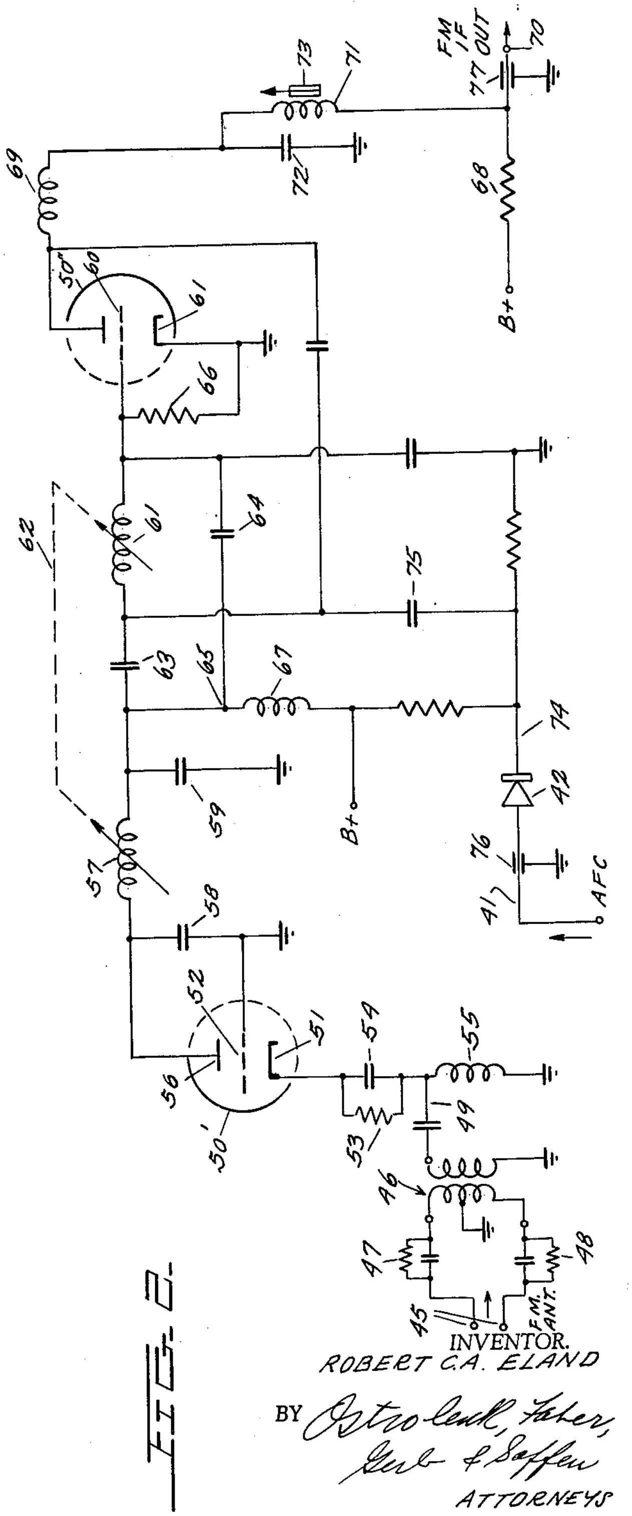
FIGURE 2 is a schematic electrical diagram of the single-tube FM tuner of the present invention.

FIGURE 2 is a schematic electrical diagram of an exemplary FM tuner which is readily usable in connection with the invention TV conversion circuit indicated in FIGURE 1 and detailed FIGURE 3. The FM tuner of FIGURE 2 is usable also for the direct reception of broadcast FM radio signals in a broadcast receiver. An FM antenna is connected to input terminals 45, 45 of a conventional 300 to 150 ohm ferrite balun 46. Antenna isolation R-C units 47, 48 are inserted between the FM antenna and balun 46, when required.

Output lead 49 connects to the input cathode 51 of RF amplifier section 50′ of a dual-purpose single vacuum tube. The grid electrode 52 of triode 50′ is signal grounded. A self-biasing resistor 53 with a by-pass condenser 54 is connected between signal lead 49 and cathode 51. An RF choke 55 is provided to complete the D.C. circuit for tube 50′ without interfering with the FM signal input thereto. The triode section 50′ amplifiers the FM-RF signals.

The anode 56 output of triode 50′ is connected to a pi-tuned network comprising tunable inductance 57 and shunt condensers 58 and 59. The output of the pi-tuned network 57, 58, 59 is coupled to the input grid 60 of the autodyne mixer-oscillator section 50″ of the composite dual triode tube. A suitable commercial tube for the 50′—50″ triodes is 6DT8. The mixer-oscillator section 50″ is an autodyne circuit incorporating tunable oscillator coil 61. Coil 61 is ganged to the RF plate output coil 57 as indicated at 62.

A capacity divider comprising condensers 63 and 64 is used in the tank of the oscillator circuit, namely across coil 61. To reduce the amount of oscillator voltage feeding back into the plate 56 of the RF amplifier section 50′, the values of condensers 63 and 64 are so chosen that for the oscillator frequencies involved in the system the tap 65 is close to ground potential to minimize oscillator radiation. A grid leak resistance 66 couples the grid 60 of the oscillator-mixer with the grounded cathode 61 thereof.

The B+ supply is applied to the RF section 50′ through RF choke coil 67. The B+ supply to the oscillator-mixer 50″ is supplied through a dropping resistor 68 and isolation choke 69. The IF output at lead 70 of the FM tuner is derived from inductance 71 tuned to the IF frequency ($f_m$) shunted by a suitable condenser 72. The slug 73 within coil 71 is used to adjust to the maximum output for the tuner as is understood. Its IF output at the $f_m$ frequency is 11.7 mc. when used in the TV circuit described in connection with FIGURE 1, or 10.7 mc. when used in a conventional FM broadcast receiver circuit.

The silicon junction diode 42 is coupled to the input of the mixer-oscillator circuit 50″ through lead 74 and coupling condenser 75. The lead 41 connecting to the diode 42 enters the FM tuner chassis through feed-through condenser 76. The output lead 70 of the FM tuner passes through the chassis preferably through a feed-through condenser 77. Feed-through condenser 76 and 77 are desirably 1,000 mfd. The back-bias from the ratio detector 35 (FIG. 1), as applied to the silicon junction diode 42, causes its capacity value to correspondingly change thereby varying the frequency of the oscillator section of the autodyne mixer 50″ to stabilize the operation of the overall system, as will now be understood by those skilled in the art.

An important advantage of the use of the silicon junction diode 42 is that it does not require any operating or standby power. Also it is a high resistance device as compared to even germanium diodes. Further, it is an extremely simple and compact manner of providing effective AFC for the FM tuner system and permits the construction of a stabilized FM tuner with only a signal tube (50′—50″). A pentode section may be used at 50″ instead of the triode for the autodyne mixer-oscillator to afford approximately 6 db more gain at output 70.

FIGURE 3 illustrates a TV tuner circuit with an FM conversion strip within dotted rectangle 80. The exemplary tuner circuit is for a turret, drum or disc type tuner having fixed circuit sections connectable through contacts to separate panels or tuning sections for the twelve TV channels. There is herein used the additional panel or strip 80 for the FM conversion. It is to be understood that the invention herein may also be applied to other types of tuners, such as the switch or wafer types. The TV tuner of FIGURE 3 is thus a thirteen-position tuner wherein the thirteenth position has the conversion strip 80 applied thereto for FM usage. The tuner itself may take various structural and circuital forms.

The exemplary TV tuner of FIGURE 3 has its TV antenna connected at input terminals 80, 81 to a balun transformer 82, converting the balanced 300 ohm input to an unbalanced signal for the input to the signal ended RF amplifier stage 83. Stage 83 is shown as a triode and it is to be understood that tetrode, pentode or cascode RF amplifier circuits may be used instead of the RF triode section 83 herein. A preferred tube for triode 83 is the high frequency amplifier 6BN4 having two terminal outputs for its grid electrode 84 and two for its cathode 85. The triode 83 is connected in an automatically neutralized circuit for the wide TV frequency band of 54 mc. through 216 mc. This neutralized circuit for triode 83 is more fully set forth in copending application Serial No. 600,496, filed on July 27, 1956, now U.S. Patent No. 2,949,580, and assigned to the assignee of the present case.

Neutralizing condenser 86 is adjusted in conjunction with feed-through condenser 87 and the capacities of the output circuit of tube 83 including adjustable condenser 87 and fixed condenser 88 across tunable coil 89. The B+ supply to the anode electrode 90 of triode 83 is supplied through dropping resistor 91. The signal lead 92 is impressed upon the RF input through parallel trap 93, series trap 94, 95 and coupling condenser 96. The AGC bias connection to grid 84 of triode 83 is applied through lead 96 and resistor 97. During TV channel reception there is connected between contacts 104 and 105 of the corresponding channel strip, a series coil which effects tuning-in of the selected TV channel to the input of grid 84. The two terminals of grid 84 are interconnected through lead 98.

For FM conversion eleven-contact strip 80 is turned into the selection position with the fixed tuner portion as illustrated in FIGURE 3. In this mode the terminals 101, 102 provide for energization of the B+ or anode circuit of the TV receiver at terminal 115, becoming connected to contact 101 through contact 102 and dropping resistor 116. Thus, by connecting the B+ terminal of the FM tuner to terminal 117 the FM tuner is directly energized with B+ supply and becomes immediately operative when heater current to the single tube 50′—50″ is "on."

The FM-IF output connection 70 of the FM tuner of FIGURE 2 is plugged-in or connected to coaxial terminal 120 and connects directly to contact 103 of strip 80. The strip 80 comprises narrow-band FM-IF amplifier circuit including the tuned input and output for triode amplifier 83. The band width utilized therefor is only a few hundred kilocycles which is requisite for the full modulation of the broadcast FM radio signals. The use of the narrow band at the input and output circuits of amplifier 83 prevents cross-modulation from other FM stations, and eliminates cross-modulation or interference in such narrow band stage.

Terminal 103 is accordingly the IF input from the FM tuner and contains a tuned circuit connected from the terminal 103 to terminal 105 which in turn connects to the input of the grid electrode 84 of the RF triode amplifier stage 83. The input circuit designated A is at the FM-IF frequency name $f_m$, which in the exemplary embodiment is 11.7 mc. The tuned circuit A consists of an adjustable inductor 121 with condenser 122 in parallel therewith, connected by condenser 123 to ground 124 through internal shield 125 in the strip 80 and lead 126 to obtain the proper impedance match to input grid 84.

The grid 84 is connected to the tuned circuit 121, 122 through a coil 127 and resistance 128 in parallel via lead 129. The parallel coil resistor 127—128 arrangement is a parasitic depressor which is found desirable to operate the normal TV tuner circuit at the low FM-IF frequency ($f_m$), and at the narrow band width. The corresponding tuned plate circuit B of RF amplifier stage 83 is connected between contacts 106, 107. The circuit B comprises a tunable inductor 89 with a parallel condenser 88 resonating at the $f_m$ IF frequency of 11.7 mc. in the present example.

The grid circuit of mixer 133 connects between contacts 108, 109 of strip 80. The mixer grid circuit C comprises tunable inductor 130 in parallel with a condenser 131 resonating at the $f_m$ frequency. The parallel tuned circuit 130, 131 is connected to the control grid 132 of the pentode mixer stage 133 through the parasitic depressor circuit 134, 135. A coupling condenser 136 is connected between the grid 132 and the contact 109. The proximate tuned circuits B and C have sufficient coupling for interstage coaction.

The oscillator tuned circuit D connects between contacts 110 and 111. The oscillator circuit D comprises the tunable inductor 137 in parallel with series connected condensers 138, 139. The circuit D is essentially a Colpitts oscillator wherein condensers 138, 139 determine the feedback ratio. The resistor 140 in parallel with coil 141 is a parasitic depressor to prevent parasitic oscillation at UHF frequencies. The interconnection 142 of the Colpitts circuit condensers 138, 139 is conducted through lead 142, 143 to terminal 144 of the mixer input circuit C.

The frequency, to which the oscillator circuit D (in association with the remainder of the tank circuit including coil 145 and condenser 146 in the oscillator section 150) is tuned, is to beat with the $f_m$ input frequency of the tuned circuits A, B and C at mixer 133, to effect the desired IF output for the TV-IF amplifier. The arrangement illustrated in FIGURE 1 hereinabove requires that the basic IF output frequency of the TV tuner of FIGURE 3 or of the IF amplifier 30, have the $f_m$ IF frequency of circuits A, B and C heterodyned with the second harmonic of the circuit D; also, that the third harmonic of the frequency $f_o$ circuit D pass on through the IF output of the tuner of FIGURE 3 to the TV-IF amplifier 30. The basic IF frequency for the TV receiver hereof is in the 41-plus mc. range with the tunable inductor 155 at the anode output 156 of mixer 133, having a condenser 157 connected across it to ground. The output in the 41-plus mc. frequency band of mixer 133 is accordingly fed to the coaxial terminal 160 through coupling condenser 158 and constitutes the IF output of the tuner at its central connection 161.

It is to be understood that other variations for providing the two carrier frequencies in the IF amplifier 30 separated at the carrier frequency of 4.5 megacycles may be utilized. For example, if a suitable $f_m$ frequency is used at the TV tuner input and a suitable IF frequency range is at the IF amplifier 30, it is sufficient that the heterodyned beat at the input to the IF amplifier be equal to $(f_m+f_o)$. With the companion frequency spaced therefrom being at the $2f_o$ frequency it is noted that these two companion frequencies be spaced at 4.5 megacycles or at the frequency detection spacing used. Also, where a frequency band for the IF amplifier has the heterodyned frequency equal to $(f_m+3f_o)$ the independent carrier would be at $4f_o$.

In other words, the basic formulation is to have the fundamental frequency of the oscillator 150 at circuit D namely $f_o$ equal to ($f_m$+4.5 mc.). Then the heterodyne carrier with the FM broadcast signals thereof will have a frequency selected by the corresponding IF amplifier would provide a base for the frequency detection of the FM signals equal to $(n+1)f_o$.

Figure 4:
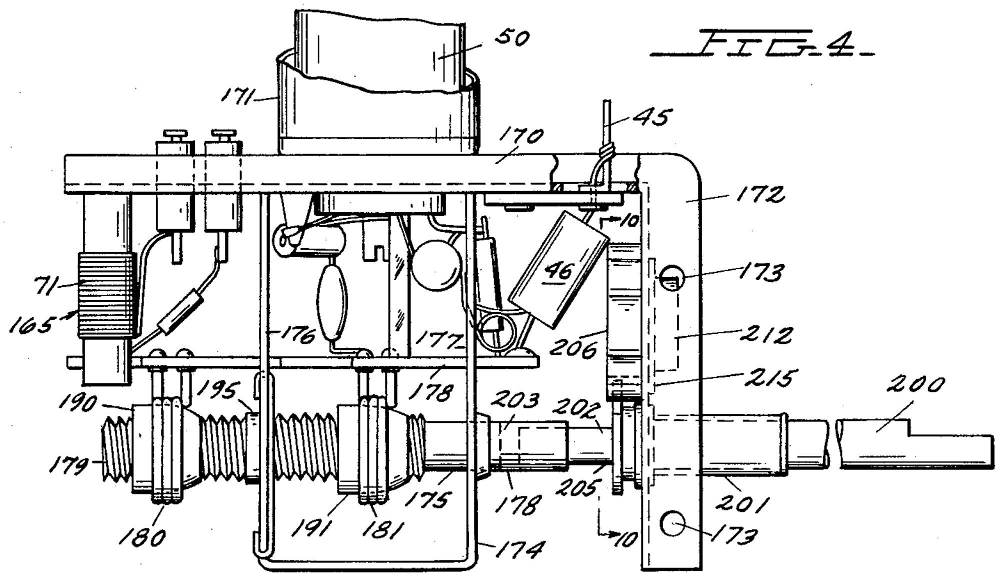
FIGURE 4 is an elevational view of an exemplary FM tuner unit.

FIGURE 4 is an elevational view of an exemplary single tube FM tuner utilized in the above circuitry, and with circuitry and components corresponding to the schematic electrical diagram of FIGURE 2. The vacuum tube 50 is mounted on the chassis base 170 and contains base shield 171. The chassis consists of a unitary L-shaped frame with a vertical flange section 172 suitably apertured at 173 for mounting on a basic chassis or TV unit. A U-shaped subchassis 174 is secured to the other side of the horizontal chassis base 170 which in turn mounts a low loss dielectric tuning shaft 175, axially to the sides 176, 177 of subchassis 174. A dielectric subchassis 177 is supported centrally across U-frame 174 for supporting components of the tuner including air inductors 180, 181.

Inductors 180, 181 comprise only a few turns as illustrated. The tuning is accomplished by the relative positioning of metallic slugs 190, 191 axially with respect to inductors 180, 181 as will be described hereinafter. The output coil 71 (see also FIGURE 2) is tunable from the top of chassis 170 to the selected output frequency $f_m$. Other components such as disc capacitors and resistors of the tuner circuit (FIG. 2) are suitably interconnected with the main components in a manner readily understood by those skilled in the art, and are not shown in detail.

The external tuning shaft 200 is rotatably mounted in a bushing 201 and supported in the vertical frame section 172. An extension 202 of shaft 200 gauges a slot 203 in the forward end 178 of dielectric rod 175. The number of rotations of shaft 200 is controlled by mechanism 205, 206 detailed in FIGURE 10, and described hereinafter. The exemplary arrangement permits four full rotations of tuning shaft 200 to effectuate the full FM tuning swing of the tuner 165 through the frequency band 88 to 108 mc.

Figure 5:
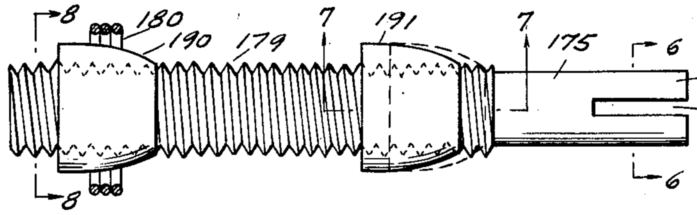
FIGURE 5 is an enlarged elevational view of the tuning member of the FM tuner of FIGURE 4.
Figure 6:
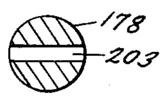
FIGURE 6 is a cross-sectional view taken along line 6—6 of FIGURE 5.

FIGURE 5 is an enlarged view of the dielectric tuning shaft 175 and the associated metallic slugs 190, 191 which effects the inductive changes of the associated inductors 180, 181. The tuning slugs 190, 191 are movable axially within the respective air wound coils 180, 181 by the motion of the threaded shaft 175. The threads 179 on dielectric shaft 175 coact with threaded boss 195 in vertical frame member 176 which rotatably support the shaft 175. Rotation of shaft 175 through control shaft 200 causes corresponding axial displacement of shaft 175 with respect to the fixedly mounted tuning coils 180, 181.

Figure 9:
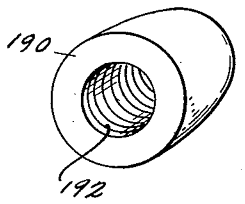
FIGURE 9 is a perspective view of a tuning slug of the FM tuner of FIGURES 4 to 8.

Slotted portion 203 of shaft 175 permits extended engagement with extension 202 of shaft 200. Carried on the threaded shaft portion 179 are slugs 190, 191 that have internal threads 192 (see FIGURE 9). Initial positioning or tracking of slugs 190, 191 is adjusted with respect to coils 180, 181 by the relation with the axial displacements of the tuning shaft 175. The material of slugs 190, 191 is non-magnetic such as brass or aluminum which efficiently changes the frequency of the air coils 180, 181. Suitable plating of slugs 190, 191 is desirable.

Figure 7:
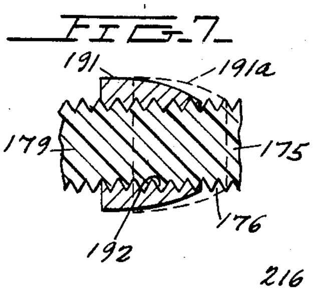
FIGURE 7 is a cross-sectional view taken along the line 7—7 of FIGURE 5.
Figure 8:
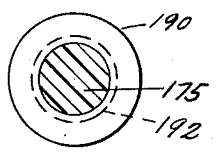

FIGURE 7 is an axial cross-sectional view through tuning slug 191 showing the coaction of the threads 179 of dielectric shaft 175 with the internal threads 192. The dotted position 191*a* illustrates the relative positioning of slug 191 with respect to shaft 175, which is readily effectuated by simply rotating the slug 191 on the shaft 175 for tracking purposes. Thus slugs 190 and 191 are readily positioned relative to the stationary coils 180, 181 and tracked with respect to control shaft 200.

Figure 8:
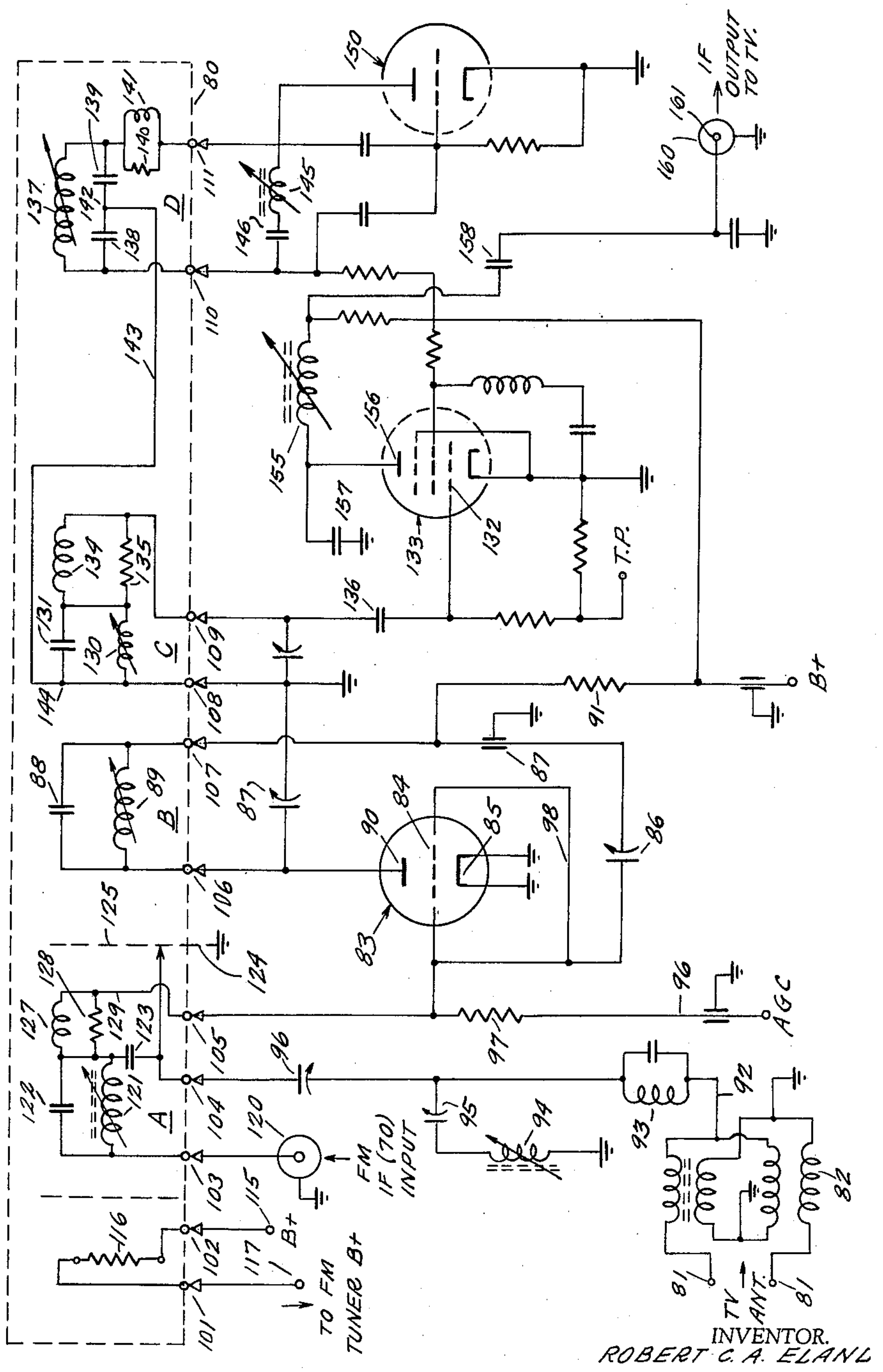
FIGURE 8 is a cross-sectional view taken along the line 8—8 of FIGURE 5.

FIGURE 8 is an end view of slug 190 with respect to dielectric shaft 175. The linear displacement cross-sectional effective action of slugs 190, 191 is such as to effectuate a frequency change in the circuits of the corresponding tuning coils 180, 181 in a logarithmic relation with respect to the linear axial displacement of shaft 175. Shaft 175 displacement corresponds exactly to the linear displacement of slugs 190, 191 with respect to the interior of coils 180, 181. This effects a corresponding logarithmic frequency shaft proportional to the angular rotation of control shaft 200. The frequency range over which this logarithmic relationship is made to hold preferably is in excess of the operating range of the tuner by such an amount that normal variations and component values of the tuner circuits, and those associated with it can be readily compensated for by shifting the linear position of the slugs 190, 191 (as indicated in FIGURES 5 and 7) with respect to the fixed coils 180, 181. Shifting of the linear position of slugs 190, 191 in this manner repositions the frequency of the individual coil actions so that every tuned frequency point will correlate with the linear travel effectuated by the angular rotation of control shaft 200 as will now be understood by those skilled in the art.

The characteristic known as tracking can accordingly be effectuated independent of the normal component variations in the overall FM tuner production. This eliminates the need for additional components to compensate for tracking errors normally introduced from such source. The position of slugs 190, 191 once suitably tracked is readily secured to the dielectric shaft 175 as by a dielectric adhesive such as glyptol.

Figure 10:
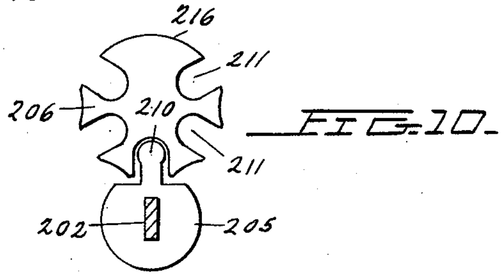
FIGURE 10 is a view taken along the line 10—10 of FIGURE 4 in the direction of the arrows.

FIGURE 10 illustrates one form of mechanism which controls the number of excursions of shaft 200 to effectuate a full FM frequency band sweep in the FM tuner. Cam element 205 extending from control shaft 200 has a projecting lip 210 which coacts with a series of cavities 211, 211 in the periphery of dielectric disc 206. Disc 206 is rotatably mounted in vertical frame 172 (FIGURE 4) through a post 212 extending in an opening therein, and lockwasher 215. There are four cavities 211 in disc 206 which permit shaft 200 to rotate four times before being locked at either end at the solid portion 216 of disc 206.

While the present invention has been described in connection with an exemplary electrical and mechanical embodiment thereof it is to be understood that the principles and features thereof are subject to modification and variation by those skilled in the art, without departing from the broader spirit and scope thereof as defined in the following claims.

I claim:

1. A television receiver for receiving the band of broadcast FM radio signals, including an FM tuner means for heterodyning said band of broadcast radio signals down to a common IF frequency $f_m$, for presentment to a TV tuner means; said TV tuner means comprising an RF amplifier stage for amplifying the FM modulated $f_m$ signals, an oscillator for generating a basic frequency $f_o$ (equal to $f_m$ plus the frequency separation of the sound and video carriers of each TV channel), a mixer heterodyning the RF amplified FM modulated $f_m$ signals with the second harmonic of $f_o$ to form a heterodyned signal, and circuit means for coupling said heterodyned signal together with the third harmoic of $f_o$ to the IF amplifier of the TV receiver, said receiver incorporating FM detector means responsive to the IF amplifier output for deriving the audio signals from the resultant beat signal, for presentment to a TV tuner means; said TV tuner means at the frequency $(f_o - f_m)$.

2. A television receiver as claimed in claim 1, wherein the said mixer heterodyned FM modulated signal is of a frequency magnitude to effectively fall within the bandpass of the receiver IF amplifier.

3. A television receiver as claimed in claim 1, wherein the said third harmonic of $f_o$ is of a frequency magnitude to fall somewhat beyond the bandpass of the IF amplifier for amplification thereby without disturbing its biasing.

4. An intercarrier television receiver for receiving the band of broadcast FM radio signals, including an FM tuner means for heterodyning said band of broadcast FM radio signals down to a common IF frequency $f_m$ for presentment to a TV tuner means; said TV tuner means comprising a narrow tuned RF amplifier stage for amplifying the FM modulated $f_m$ signals, an oscillator generating a basic frequency $f_o$ (equal to $f_m$ plus a predetermined amount, equal to the frequency separation of the sound and video carriers of each TV channel), a mixer heterodyning the RF amplifier FM modulated $f_m$ signals with the $n$th harmonic of $f_o$ to form a heterodyned signal, circuit means for coupling said heterodyned signal together with the, $(n+1)$ harmonic of $f_o$ to the IF amplifier of the TV receiver, and FM detector means responsive to both said heterodyned and $(n+1)$ harmonic signals separated by the amount requisite for its detection operation to derive the audio modulations of the received FM signals.

5. A television tuner of receiving VHF television channels and the band of broadcast FM radio signals suitably heterodyned down to a common IF frequency $f_m$ from a FM tuner, said television tuner comprising an RF stage tuned for amplifying the FM modulated $f_m$ signals, an oscillator generating a basic frequency $f_o$ (equal to $f_m$ plus 4.5 megacycles), a mixer heterodyning the RF amplified FM modulated $f_m$ signals with the second harmonic of $f_o$, and circuit means for coupling said heterodyned mixer signals together with the third harmonic of $f_o$ to the IF amplifier of the TV receiver.

6. A television tuner as claimed in claim 5, wherein the said mixer heterodyned FM modulated signal is of a frequency magnitude to effectively fall within the bandpass of the receiver IF amplifier and the said third harmonic of $f_o$ being of a frequency magnitude to fall somewhat beyond the bandpass of the IF amplifier for amplification thereby without disturbing its biasing.

7. An intercarrier television receiver as claimed in claim 4, wherein the said mixer heterodyned FM modulated signal is of a frequency magnitude to effectively fall within the bandpass of the receiver IF amplifier, the said $(n+1)$ harmonic of $f_o$ being of a frequency magnitude related to the bandpass of the IF amplifier for amplification thereby without disturbing its biasing.

8. A television tuner as claimed in claim 5, wherein the tuner sections for said RF stage, mixer and oscillator are mounted on a panel connected with a plurality of contacts for circuital relation with the basic television tuner circuitry to effect its conversion for the FM reception.

9. A television receiver for receiving the band of broadcast FM radio signals, including an FM tuner means for heterodyning said band of broadcast radio signals down to a common carrier frequency $f_m$; TV tuner means including an oscillator and mixer stage; said oscillator stage generating a basic frequency $f_o$ and harmonics thereof; said mixer stage heterodyning the FM modulated signal $f_m$ with a first of said oscillator generated signals to form a heterodyned signal; said oscillator signal $f_o$ operatively related to said FM modulated signal $f_m$ such that said modulated signal differs from a second of said oscillator generated signal by a predetermined frequency amount; circuit means for coupling both of said heterodyned and said second oscillator generated signals to an IF amplifier, terminating with FM detector means responsive to signals differing by said predetermined frequency amount for deriving the FM audio signal.

10. A television receiver as set forth in claim 9, wherein said first and second oscillator generated signals are successive harmonics; and said basic oscillator generated signal $f_o$ differs in frequency from said common carrier frequency $(f_m)$ by said predetermined frequency amount.

11. A television tuner as set forth in claim 10, wherein said predetermined frequency amount is approximately 4.5 megacycles, and said heterodyned and second oscillator generated signals are above 41 megacycles.

References Cited in the file of this patent

UNITED STATES PATENTS

| | | |
|---|---|---|
| 2,510,906 | Reid | June 6, 1950 |
| 2,594,915 | Guillemant | Apr. 29, 1952 |
| 2,641,708 | Carlson | June 9, 1953 |
| 2,666,847 | Alter | Jan. 19, 1954 |
| 2,677,049 | Rogers | Apr. 27, 1954 |
| 2,835,798 | Hermeling | May 20, 1958 |
| 2,855,456 | Morrison | Oct. 7, 1958 |
| 2,873,360 | Lyman | Feb. 10, 1959 |
| 3,054,058 | Towler | Sept. 11, 1962 |

OTHER REFERENCES

Basic Television, vol. 2, Rider; pp. 2–44.

Morrissett, "Converter for Intercarrier," Radio and TV News, July 1957, pp. 108–109.